United States Patent [19]

Neilsen

[11] 4,253,223

[45] Mar. 3, 1981

[54] DEBURRING DEVICES

[76] Inventor: Hildaur L. Neilsen, 2 Juniper St., Metuchen, N.J. 08840

[21] Appl. No.: 68,485

[22] Filed: Aug. 21, 1979

[51] Int. Cl.³ .............................................. B21C 37/30
[52] U.S. Cl. ..................................................... 29/90 R
[58] Field of Search ......................................... 29/90 R

[56] References Cited

U.S. PATENT DOCUMENTS

| | | | |
|---|---|---|---|
| 2,541,455 | 2/1951 | Anderson | 29/90 R |
| 2,732,610 | 1/1956 | Hallock | 29/90 R |
| 3,610,008 | 10/1971 | Foedisch | 29/90 R |

FOREIGN PATENT DOCUMENTS

| | | | |
|---|---|---|---|
| 887921 | 8/1953 | Fed. Rep. of Germany | 29/90 R |
| 494241 | 4/1976 | U.S.S.R. | 29/90 R |

Primary Examiner—Harrison L. Hinson
Attorney, Agent, or Firm—Robert Henderson

[57] ABSTRACT

A generally cylindrical, rotatable housing contains, against material axial shifting but with limited permissible lateral shifting, an approximately coaxial peening stem as a peening tool. An outer end of said tool, projecting from the housing, is formed with an encircling, continuous peening groove. The housing is formed with an uninterrupted circular series of inwardly facing projections within which the peening stem extends somewhat loosely. Upon rotation of the housing, forceful holding of a workpiece's metal edge in said groove while the workpiece is moved translationally, causes the peening tool to be rapidly hammered laterally, successively by the projections of said series; this hammering effect being transmitted by said tool to said metal edge whereby said edge is peened and deburred.

6 Claims, 5 Drawing Figures

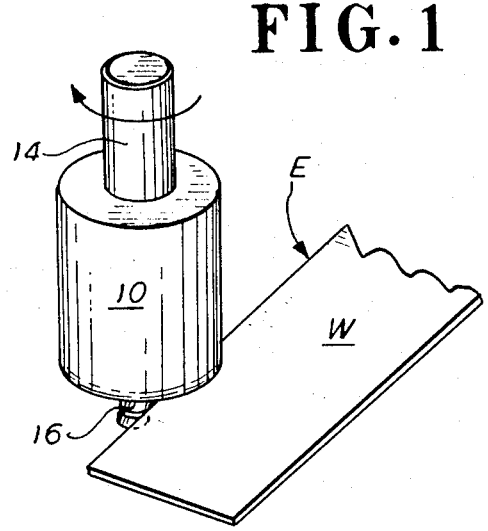
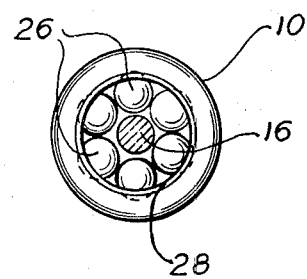
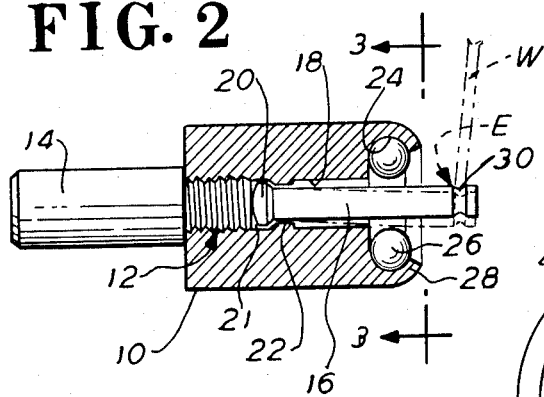
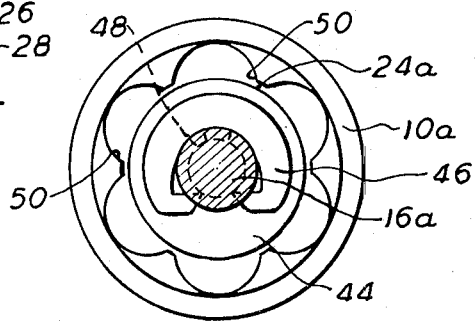
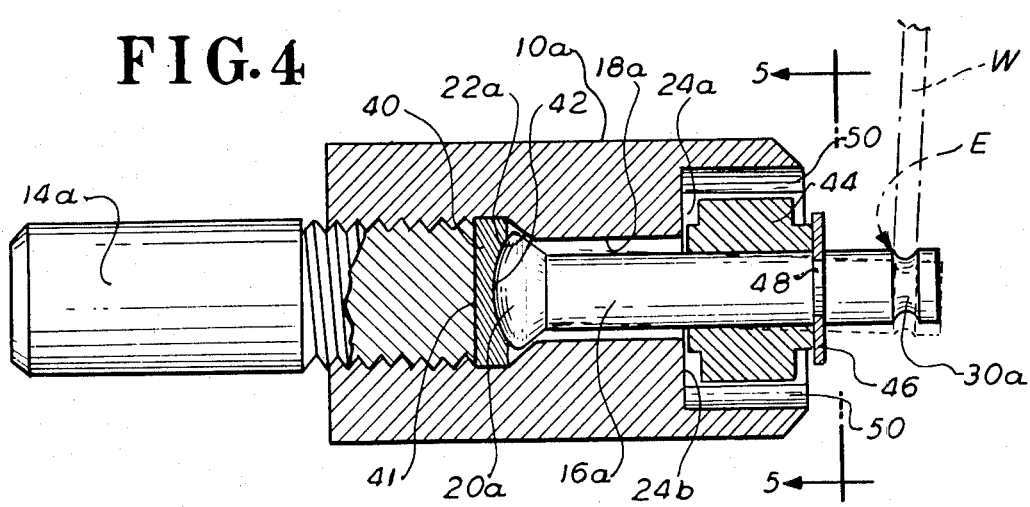

DEBURRING DEVICES

BACKGROUND AND OBJECTS OF THE INVENTION

The broad principle of vibrationally hammering a peening tool against a sheet metal edge to be deburred has quite recently been developed and has proven to be very effective. Deburring devices employing that principle are shown, for example, in my patents numbered U.S. Pat. Nos. 3,707,087, 3,827,270, 3,866,452, 3,926,031, 4,041,751, and 4,089,204.

An important object of the present invention is the provision of effective deburring devices employing the mentioned vibrational hammering principle, which devices, however, are simpler and less costly to manufacture than the mentioned prior deburring devices.

Another important object is the provision of such simplified deburring devices which are useful for deburring either outside edges of sheet metal or inside edges of small holes or openings in sheet metal.

Another important object is the provision of such simplified deburring devices in which different peening tools may very readily be substituted in the devices as conditions of use make desirable or necessary.

The foregoing and other more or less apparent objects and improvements are achieved by the present invention of which the following is a specification.

BRIEF DESCRIPTION OF THE ACCOMPANYING DRAWING

In the accompanying drawing illustrating the invention:

FIG. 1 is a perspective view of deburring apparatus according to a first embodiment of this invention, shown in deburring association with an edge E of a sheet metal workpiece W.

FIG. 2 is a central, axial, sectional view of a deburring device according to said first embodiment.

FIG. 3 is a transverse, sectional view of the first embodiment on the line 3—3 of FIG. 2.

FIG. 4 is a central, axial, sectional view of a deburring device according to a second embodiment of the invention.

FIG. 5 is a transverse, sectional view of said second embodiment on the line 5—5 of FIG. 4.

DETAILED DESCRIPTION

The apparatus of the first embodiment comprises a generally cylindrical, rotatable housing 10, tightly threaded at its back end, as at 12, onto a motor drivable shaft 14. An elongate, cylindrical peening tool 16 is somewhat loosely disposed, approximately coaxially, in a forwardly opening bore 18 in the housing. The peening tool 16 is formed, at its back end, with a rounded head 20 which is retained against material axial movement in a space 21 between the adjacent end surface of the shaft 14 and an annular shoulder 22 at the inner end of the bore 18. Thus, the entire tool 16 is held against material longitudinal movement.

The diameter of the shoulder 22 is greater than the diameter of the tool 16 but less than the diameter of said tool's head 20; thereby, the tool 16 is retained in place with its head 20 in the space 21. The space 21 and the head 20 are of such relative dimensions that the peening tool 16 is capable of limited universal movement for a purpose hereinafter explained.

The bore 18 is substantially enlarged at its outer end to form an annular recess 24 containing a circular series of closely arranged balls 26 through which series the outer end of the peening tool 16 extends with a loose fit. A swaged-in circular marginal portion 28 of the housing serves to clamp the balls 26 fixedly in the housing, so that the balls serve as inwardly facing projections. A continuous peening groove 30 encircles the tool 16 toward the latter's projecting end.

In operation, the shaft 14 and the housing are suitably motor rotated. An edge E of a workpiece W is held in the groove 30 while the workpiece is translationally moved along in relation to said groove with sufficient laterally directed force to cant the tool 16 laterally, as shown in broken lines in FIG. 2, to an extent sufficient to bring said tool, in rapid succession, into lateral hammering engagement with the ball-projections 26. Such hammering causes the surfaces defining the groove 30, to peen and debur the edge E being moved along in said groove.

The apparatus of the disclosed second embodiment functions substantially like that of the first embodiment but is more refined in structure.

At the inner end of a shaft 14a of the second embodiment, is disposed a circular plate 40 having a flat back face 41 bearing firmly against the adjacent end of said shaft, and a concave front face area 42 in which a rounded end surface of a head 20a of a peening tool 16a bears and is capable of limited universal sliding within the concave area 42 of the plate 40. A bore 18a in a housing 10a terminates inwardly at a shoulder 22a which engages the head 20a and retains the tool 16a in said housing.

The bore 18a terminates outwardly in an enlarged annular recess 24a within which the tool 16a carries a collar 44. held slightly loosely against a back face 24b of said recess by an E-snap ring 46 seated in a circular groove 48 located toward the protruding end of the tool 16a.

An uninterrupted circular series of inwardly facing projections 50 are provided as integral parts of the coaxial wall of the recess 24a these projections being slightly spaced from the collar 44. A peening groove 30a is provided toward the outer end of the peening tool 16a.

The operation of the second embodiment is similar to that described with respect to the first embodiment. The projections 50 of the second embodiment serve similarly to the ball-projections of the first embodiment, when the device is in use, to impose a laterally directed hammering effect on the peening tool 16a to yield the described peening and deburring effect.

Peening tools of different sizes may easily be substituted in both embodiments. In the first embodiment, such substitution involves unscrewing and removing the shaft 14 from the housing 10 leaving the back end of the housing open for removal of one peening tool 16 and substitution of a replacement tool; after which the shaft 14 is threaded back into the housing 10.

Tool substitution in the second embodiment involves additionally that the E-snap ring 46 be removed and later reapplied to complete a tool replacement operation.

The canting of the peening tools has been somewhat exaggerated in the drawing for illustrative purposes. The parts of the disclosed devices should be of steel of suitable characteristics.

Although the use of the disclosed devices is shown with reference to an outside or easily accessible workpiece edge, the small diameter of the protruding portion of the peening tool makes devices according to this invention very useful in deburring the edges of small holes in sheet metal.

It should be apparent that various other structural arrangements may be employed without, however, departing from the invention as set forth in the accompanying claims.

I claim:

1. A deburring device comprising a generally cylindrical, rotatable housing formed with a coaxial bore therein; a generally cylindrical peening tool disposed in said bore with a portion of said tool protruding beyond an end extremity of said housing, said protruding portion being formed with a continuous, encircling peening groove; and a circular, uninterrupted series of projections in said housing in loosely surrounding relation to said peening tool; said loose relationship being such that force applied, through a workpiece edge held in said groove, in a lateral direction while the edge is moved along in the groove, displaces the peening tool laterally into hammering engagement with a succession of the projections of said series.

2. A deburring device according to claim 1, said housing having a driving shaft rigidly connected axially thereto.

3. A deburring device according to claim 1, said projections being balls fixedly confined within an annular recess located at one end of said housing.

4. A deburring device according to claim 1, said bore opening into an enlarged annular recess at one end of said housing, said circular series of projections being in said recess and rigidly integral with said housing; said tool having an annular collar extending therearound, and said collar having an outer cylindrical surface in transverse alignment with said projections and loosely spaced from the latter.

5. A deburring device according to claim 1, the inner end of said peening tool being universally mounted within said housing to permit canting of said tool in any direction relatively to the housing's longitudinal axis.

6. A deburring device according to claim 1, said bore including a circular, rearwardly facing shoulder; said peening tool being formed with an enlarged rear-end head disposed rearwardly of said shoulder; and a drivable shaft threaded coaxially into the rear end of said housing into a retaining position relatively to said peening tool to limit rearward movement of the latter; said drivable shaft being removable to facilitate substitution of different peening tools desired to be used.

* * * * *